Oct. 4, 1960
J. E. HARVEY
2,954,653
DUST EXTRACTORS FOR ROTARY GRINDERS
EMPLOYING FLEXIBLE GRINDING DISCS
Filed Feb. 17, 1959
2 Sheets-Sheet 1
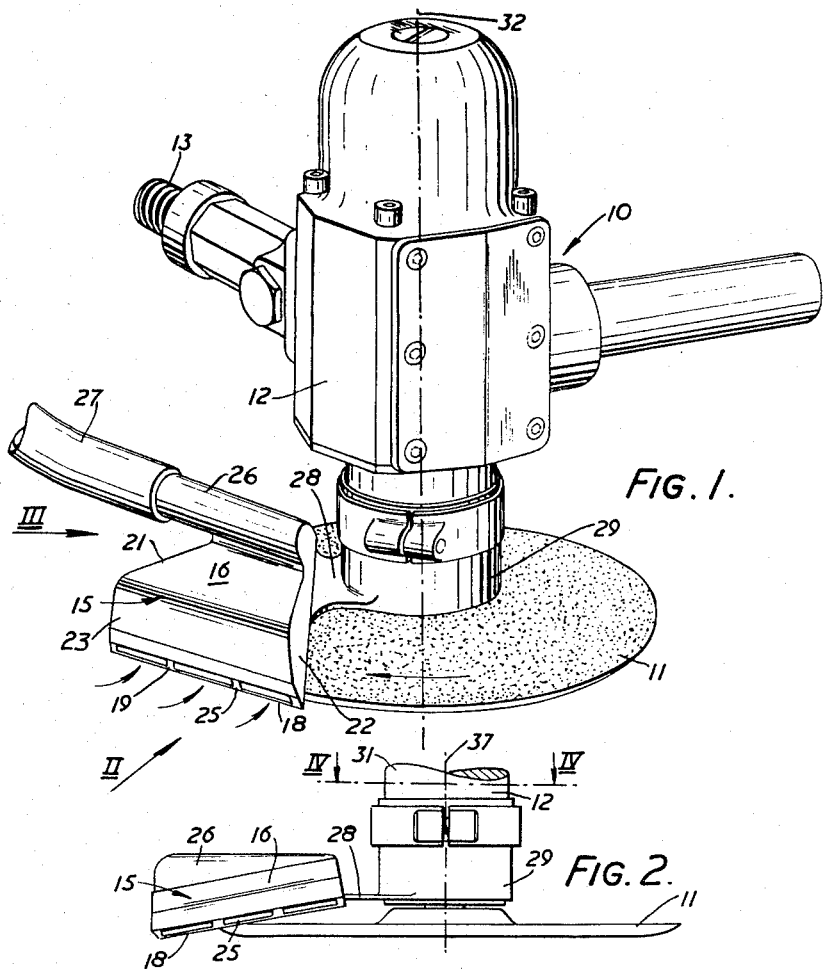
FIG. 1.
FIG. 2.
FIG. 3.
INVENTOR
JOSEPH E. HARVEY
BY
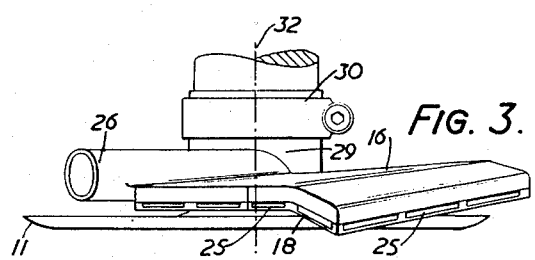
ATTORNEYS Oct. 4, 1960  J. E. HARVEY  2,954,653
DUST EXTRACTORS FOR ROTARY GRINDERS
EMPLOYING FLEXIBLE GRINDING DISCS
Filed Feb. 17, 1959  2 Sheets-Sheet 2

INVENTOR
JOSEPH E. HARVEY
BY
Watson, Cole, Grindle & Watson,
ATTORNEYS

2,954,653
DUST EXTRACTORS FOR ROTARY GRINDERS EMPLOYING FLEXIBLE GRINDING DISCS

Joseph Eric Harvey, Camborne, Cornwall, England, assignor to Holman Brothers Limited, Camborne, Cornwall, England, a company of Great Britain Filed Feb. 17, 1959, Ser. No. 793,728

Claims priority, application Great Britain Feb. 19, 1958

10 Claims. (Cl. 51—273)

This invention relates to the provision of a suction-operated dust extractor working on the low volume, high velocity system for extracting substantially at source the fine dangerous dust produced by a portable rotary grinder employing as the grinding wheel a flexible grinding disc, very thin in proportion to its diameter, of the type which is sometimes known as a cutting-off wheel. The dust produced by such a disc is very fine and is composed of small particles of silica and metal from the work and particles of silicon carbide or aluminium oxide and bonding material from the break-down of the disc. Because these dust particles are so small they are easily breathed if released into the atmosphere and constitute a considerable source of danger to the health of the operator.

Flexible grinding discs are nowadays much used on portable grinders driven by compressed air, electricity or flexible shaft drive, particularly in foundry dressing shops for the operation of cutting off risers formed on castings, and also for smoothing surfaces. When such a disc is being used as a cutting-off wheel for cutting off risers, the edge of the disc is used for the cutting operation and the wheel acts substantially in the same way as a circular saw. When the disc is used for smoothing or planing operations, the radial face of the disc remote from the body of the grinder, which will be referred to for convenience herein as the underneath face of the disc, is used for the grinding. For convenience the grinder will be referred to herein as having its axis generally upright with the grinding disc mounted beneath it in a normally horizontal plane, being secured to the lower end of the grinder shaft. But when used for smoothing and planing work, employing the underneath face of the disc, the axis of the grinder is usually inclined at between 10° and 15° to the normal to the work surface being ground, the disc flexing correspondingly in use. For such smoothing or planing operations it is of course essential that there shall be no projection of the grinder spindle or securing nut below the underneath face of the disc, and this face of the grinding disc is therefore constructed with a depressed centre.

Because this type of grinding disc is used both for edge cutting operations and for surface smoothing operations using its under surface, it has hitherto been found impossible to shroud the disc satisfactorily in any conventional manner for the purpose of controlling and extracting the dust formed in use. The present invention however provides a suitable dust extractor for use in extracting the fine dust close to its source whilst yet leaving the disc sufficiently unobstructed for use as a cutting-off wheel as well as for surface grinding.

According to the present invention there is provided in combination with a portable grinder employing a thin flexible grinding disc, a dust extractor comprising a hollow suction nozzle affording within it a suction passage or group of passages, a tubular suction duct connected to the nozzle in communication with the inner end of the suction passage or passages, and an elongated suction mouth or row of mouths formed in the nozzle at the outer end of the suction passage or passages and extending along the lower edge of the nozzle, and means for mounting the dust extractor on the grinder in an operative position above the disc and on one side of the axis of rotation of the disc, in which position the nozzle overlies only a sector of the disc subtending less than 180° at the disc centre, with the suction mouth or mouths extending along close to and just outside the arcuate edge of the disc sector.

Thus the residual portion of the profile of the flexible disc remains completely unobstructed by the nozzle of the dust extractor and can be used for either edge cutting or surface grinding operations. These operations are preferably performed using the part of the disc profile which is just in front of the upstream side of the suction nozzle, so that the cloud of dust particles generated thereby will be thrown tangentially past the nozzle whereby the finer particles will be captured by the high-velocity air stream entering the elongated suction mouth or row of mouths and will be carried thereby into the interior of the nozzle and thence via the suction duct to a filter.

The suction nozzle may be of generally flattened blade-like form affording within it a correspondingly shaped flattened fan-shaped suction passage. The outer edge of the nozzle affording the suction mouth or mouths may be curved but more conveniently it is made up of a straight outer edge portion and a straight side edge portion at right angles to the outer edge portion and situated on the downstream side of the nozzle, with respect to the direction of rotation of the disc. The corner between these two portions may be cut off at 45° and also provided, like the other two portions, with a part of the elongated suction mouth extending along it.

Preferably also the upstream side edge of the suction nozzle is closed and is inclined at an acute angle to the straight outer edge portion, lying along a chord offset from the centre of the disc. This arrangement leaves clear and available for use the central area of the disc immediately upstream of the suction nozzle.

According to a further feature of the invention, the border portion of the suction nozzle which provides the straight outer edge with its associated portion of the elongated suction mouth or mouths, is formed as a downwardly protruding lip whose under surface is downwardly inclined to the remaining flat under surface of the nozzle whereby at least a part of the nozzle mouth is carried down to the level of the plane of rotation of the disc when unflexed. This feature is of great advantage in promoting efficient dust extraction when the grinder is used for cutting-off operations employing the edge of the disc.

Furthermore the straight outer edge of the nozzle may itself be downwardly inclined from end to end relatively to the plane of the unflexed disc, the lower end of the edge being thereby brought down to the level of the edge of the unflexed disc whilst the upper end remains above it. This enables the grinder to be used for surface grinding with its axis slightly inclined to the vertical, the grinding region of the disc being that just ahead of the suction nozzle whose inclined outer edge will thus permit the disc to yield by flexing at the region applied to the workpiece surface in conformity with the inclination of its axis of rotation, without obstruction by the nozzle.

The invention resides also in the detachable suction-operated dust extractor referred to, formed as an attachment for use with a portable rotary grinder having a flexible grinding disc.

The invention may be carried into practice in various ways but two specific embodiments will now be described by way of example with reference to the accompanying drawings, in which:

Figure 1 is a perspective view of a suction-operated dust extractor mounted on a portable rotary grinder having a flexible grinding disc;

Figure 2 is a side elevation of the lower part of the apparatus of Figure 1 looking in the direction of the arrow II;

Figure 3 is a side elevation of the lower part of the apparatus of Figure 1 looking in the direction of the arrow III;

Figure 4:
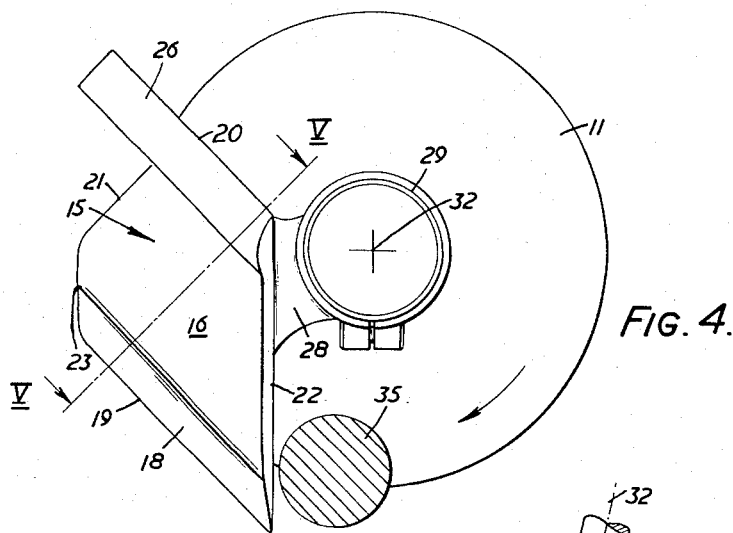
Figure 4 is a plan view of the dust extractor of Figures 1 to 3.
Figure 5:
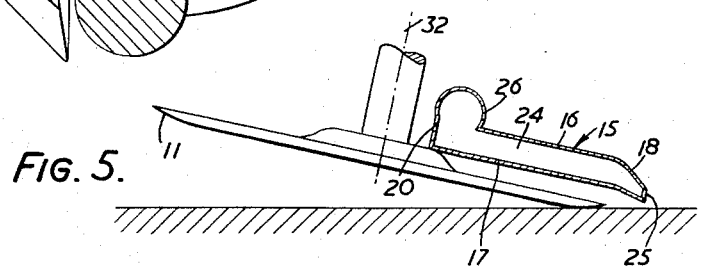
Figure 5 is a diagrammatic view, partly sectioned on the line V—V of Figure 4, of the flexible disc and of the sectioned suction nozzle tilted relatively to the working plan in use.

In the embodiment of Figures 1 to 5, a rotary grinder generally indicated at 10 has a flexible rotary cutting and grinding disc 11 mounted on the end of a driving shaft projecting from a housing 12 containing reduction gearing driven through a power input connection 13 by means such as an electric motor, a compressed air motor or a flexible shaft drive (not shown).

The dust extractor comprises a blade-like suction nozzle 15 formed by two shaped metal plates 16 and 17 secured together one above the other in spaced, generally parallel relationship by welding along their edges. The nozzle 15 is flat, save for a downwardly inclined lip 18 formed along its outer edge 19, and in profile it is shaped as a trapezium having two parallel sides forming the straight inner and outer edges 19 and 20 of the nozzle, of which the outer edge 19 is the longer, one straight side 21 at right angles to the parallel sides 19 and 20 and forming the downstream edge of the nozzle, and one straight side 22 inclined at 45° to the parallel sides 19 and 20 and forming the inclined upstream edge. In addition the corner of the nozzle lying between the outer edge 19 and the downstream side edge 21 is cut off at 45° to both of them, forming an intermediate edge portion 23. The two spaced plates 16 and 17 of the nozzle define between them a flattened, generally fan-shaped suction passage 24 (Figure 5) having an elongated, outwardly facing nozzle mouth 25 extending in aligned sections along the whole of the outer edge 19, the intermediate edge portion 23 and the downstream edge 21 of the nozzle. At its inner edge the suction passage 24 communicates with the bore of a suction duct comprising a short length of pipe 26 welded along the rear edge 20 of the nozzle and projecting beyond it for attachment to a suction hose 27 connected through a filter (not shown) to a source of suction corresponding to a depression of at least 5 inches of mercury. The suction thus draws in a high velocity airstream through the elongated nozzle mouth 25 into the interior 24 of the nozzle and thence via the suction duct 26 to the filter.

The suction nozzle 15 is provided with a strip-like mounting arm 28 welded at one end to the inner end of the upstream edge 22 of the nozzle and carrying at the other end a split sleeve 29 provided with a clamping ring 30 by means of which the sleeve can be tightened around the spigot 31 of the grinder which surrounds the rotary shaft and to which a conventional safety guard may be attached. By means of the arm 28 and clamping means 29, 30, the dust extractor can be mounted on the body 12 of the grinder in a position in which the suction nozzle 15 lies wholly on one side of the rotary axis 32 of the grinder, with the flat under plate 17 of the nozzle lying just above the disc 11 and covering a sector of the disc subtending rather less than 90° at the axis 32. In its operative position, the nozzle 15 lies with its outer edge 19 just outside the periphery of the disc 11, and with the inclined lip 18 projecting downwardly over the edge of the disc at one end, as shown in the drawings, so that the elongated suction mouth 25 extends generally around the outside of the arcuate edge of the disc sector lying beneath the nozzle. Moreover the upstream edge 22 of the nozzle in its operative position lies on a chord spaced from the axis of rotation 32 of the disc at a distance of about two fifths of its radius as indicated Figure 4.

In addition, the outer edge 19 of the disc, which is formed on the downwardly inclined lip 18 and which coincides with the major part of the length of the suction mouth 25, is itself inclined from end to end at an angle of approximately 10° to the plane of rotation of the disc, as indicated most clearly in Figures 2 and 3, so that whilst the downstream end of the edge 19 is carried down by the downwardly protruding lip 18 to a level just below the plane of the underside of the unflexed disc 11, the upstream end of the edge 19 remains above the level of the disc. This inclination of the outer edge 19 of the nozzle enables the grinder to be used for surface grinding with its axis of rotation inclined at a small angle to the vertical, the disc being then free to flex slightly upwardly during its application to the work without obstruction by the nozzle, whilst the nozzle mouth remains close to the plane of the work.

In operation, the grinder is driven by its associated compressed air or electric motor or by a flexible shaft drive to cause the flexible cut-off disc 11 to rotate in the direction towards the inclined upstream edge 22 of the nozzle 11, and the tool may then be used either for grinding a flat surface using the under face of the grinding disc as just described, or for cutting-off using the periphery of the disc in the manner of a rotary saw, for example for cutting off a riser of a casting indicated diagrammatically at 35 in Figure 4. For this last duty the cutting may be performed by the movement of the disc 11 relatively to the riser 35 along a radial path immediately in front of and parallel to the upstream edge 22 of the nozzle 15, owing to the set-back position of the latter as described.

In operation, both when cutting off and when planing or smoothing a flat surface, the rapidly rotating flexible disc 11 will generate streams of dust particles which will be projected from the face of the periphery on the disc in a direction generally transverse to the tangential upstream edge of the suction nozzle 15. The high velocity air streams entering the elongated suction mouth will be travelling in directions opposite to or across the paths of the tangentially-thrown streams of dust particles as the latter pass the outer edge 19, the interior edge 23 and the downstream edge 21 of the nozzle, whereby the finer particles of dust will be captured by the airstreams and drawn into the nozzle 15 from which they will be carried away in the suction hose 26 of the filter. The heavier particles of dust, having greater kinetic energy, will not all be drawn into the suction nozzle, but as these heavier particles are not within the range of size which is readily respirable they do not constitute a danger to the health of the operator. It is also advantageous that large quantities of these larger dust particles should not enter the suction mouth in case they should build up and choke it.

By the use of a relatively high degree of suction, in the neighbourhood of 5 inches of mercury, a relatively small volume of atmospheric air is drawn into the suction nozzle 15 at very high velocity in close proximity to the region of generation of the dust particles, and these airstreams will normally be travelling at approximately twice the velocity of the dust particles being thrown off the disc. The dangerous fine dust particles are thereby brought under control and withdrawn almost at source before they can escape in the beathing zone of the operator.

The dust extractor described and illustrated can be provided with an adjustable mounting enabling it to be fitted to grinders using discs of different diameters. This can most readily be effected by employing an extensible form of connecting arm between the clamping ring 29 and the suction nozzle, for example by the use of an adjustable slot and clamping screw.

Figure 6:
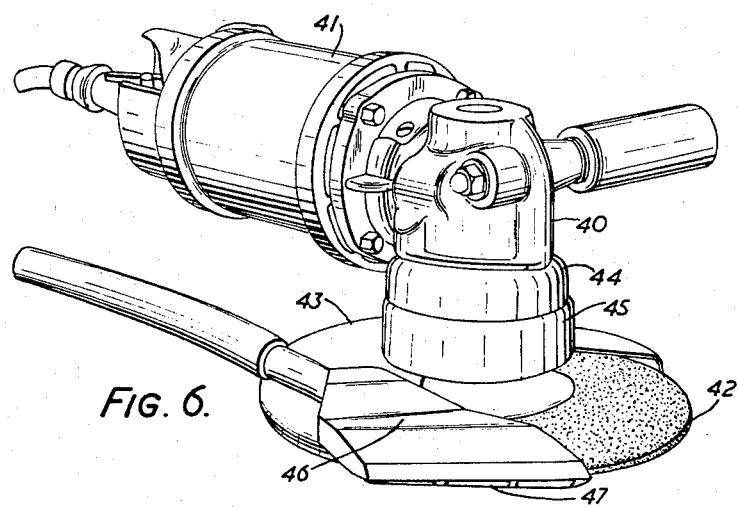
Figure 6 is a perspective view of a modified embodiment in which the suction nozzle is welded to a detachable wheel safety guard surrounding the majority of the disc.

In the modified embodiment illustrated in Figure 6, the grinder 40, which in this case is fitted with an electric motor 41 to drive the flexible disc 42, is provided with a conventional safety guard 43 of segmental form which encloses rather more than half of the area of the flexible disc 42 on its upper and lower sides and around its periphery, leaving a portion of the disc protruding for the purpose of engaging the workpiece. The safety guard 43 is secured to the spigot 44 of the grinder by means of a hub 45.

In this case the suction nozzle 46 is welded to the edge of the safety guard 43 as shown in the drawing, so as to be supported thereby in its working position with the suction mouth 47 adjacent to the periphery of the disc 42 as previously described.

It will be appreciated that, although in both the embodiments described and illustrated the grinder to which the dust extractor is fitted has been referred to for convenience as having its axis vertical and the grinding disc 11 or 42 lowermost, in practice such a portable grinder may be used at any desired convenient inclination to suit the work to be performed.

What I claim as my invention and desire to secure by Letters Patent is:

1. A dust extractor attachment for a portable rotary grinder employing a thin, flexible rotary grinding disc, the said attachment comprising a generally flat, blade-like hollow suction nozzle of generally trapezium-shaped profile, the nozzle having close-spaced upper and lower walls of similar profile spaced apart and joined at their edges to define between them a flared narrow suction passage, the lower wall having a plane undersurface, and the nozzle having long and short straight sides which are inclined at an acute angle to one another, and an outer edge, a closed long side wall joining the upper and lower walls along their long straight sides, an elongated suction mouth formed between the edges of the upper and lower walls and extending along substantially the whole lengths of the said outer edge and short side, a supporting member secured to the nozzle and extending from its long side, mounting means carried by the outer end of the supporting member, and a tubular suction duct rigidly secured to the nozzle and extending between the ends of the long and short sides at the part of the nozzle remote from the outer edge, in which the flared suction nozzle extends between the elongated suction mouth and a discharge outlet of the nozzle communicating with the interior of the tubular suction duct.

2. An attachment as claimed in claim 1 in which the outer edge of the nozzle is formed as a straight major edge portion at right angles to the short side of the nozzle and a straight corner portion which is shorter than the major edge portion and extends between the major edge portion and the short side and is inclined at an obtuse angle to both of them.

3. An attachment as claimed in claim 1 in which the marginal portion of the suction nozzle which affords the majority of its outer edge is formed as a lip which protrudes downwardly beyond the undersurface of the lower wall of the nozzle and carries a portion of the elongated suction mouth.

4. An attachment as claimed in claim 3 in which the said lip is provided with an undersurface which is inclined downwardly at a small acute angle to the undersurface of the lower wall of the nozzle.

5. An attachment as claimed in claim 3 in which the portion of the suction mouth which is carried by the lip is inclined downwardly from end to end relatively to the undersurface of the lower wall of the nozzle.

6. The combination of a portable rotary grinder having a body and a thin, flexible rotary power-driven abrasive disc pivotally mounted in the body for rotation about the disc axis, with a dust extractor comprising generally flat, blade-like hollow suction nozzles of generally trapezium-shaped profile, the nozzle having close-spaced upper and lower walls of similar profile spaced apart and joined at their edges to define between them a flared narrow suction passage, the lower wall having a plane undersurface, and the nozzle having long and short straight sides which are inclined at an acute angle to one another, and an outer edge, a closed long side wall joining the upper and lower walls along their long straight sides, an elongated suction mouth formed between the edges of the upper and lower walls and extending along substantially the whole lengths of the said outer edge and short side, a tubular suction duct rigidly secured to the nozzle and extending between the ends of the long and short sides at the part of the nozzle remote from the outer edge, the duct having an outer end connected to a source of suction and an inner end communicating with the suction passage in the nozzle, the suction passage communicating with the suction mouth, and a supporting member secured to the nozzle at one end and detachably secured to the body at the other end, the supporting member supporting the nozzle in a position in which it extends over and generally parallel to the upper side of the abrasive disc with the suction mouth extending adjacent to the arcuate edge of the disc, in which position the nozzle overlies a sector of the disc subtending an angle substantially less than 180° at the disc center.

7. The combination claimed in claim 6 in which the outer edge of the nozzle is formed as a straight major edge portion at right angles to the short side of the nozzle and a straight corner portion which is shorter than the major edge portion and extends between the major edge portion and the short side and is inclined at an obtuse angle to both of them.

8. The combination claimed in claim 7 in which the straight portion of the outer edge is formed on a downwardly protruding lip which projects below the plane undersurface of the nozzle and carries a portion of the suction nozzle which is inclined from end to end relatively to the plane of the unflexed disc, the lower end of the inclined part of the mouth being disposed below the plane of the unflexed disc, and the upper end of the inclined part of the mouth being disposed above the plane of the unflexed disc.

9. The combination claimed in claim 7 in which the position of the nozzle relative to the disc is such that the short side and the straight portion of the outer edge of the nozzle both extend nearly tangentially to the edge of the disc, and in which the long side of the nozzle overlies a chord of the disc offset from the disc center.

10. The combination claimed in claim 6 which includes a hollow segmental safety guard secured to the nozzle and supported by the supporting member, the guard surrounding a portion of the periphery of the disc remote from the long side of the nozzle.

References Cited in the file of this patent

UNITED STATES PATENTS

| 1,945,031 | Decker | Jan. 30, 1934 |
| 1,951,105 | Myers | Mar. 13, 1934 |
| 1,983,277 | Emmons | Dec. 4, 1934 |
| 2,270,151 | Terry et al. | Jan. 13, 1942 |
| 2,478,074 | Atkin | Aug. 2, 1949 |